United States Patent [19]
Moore

[11] Patent Number: 6,045,810
[45] Date of Patent: Apr. 4, 2000

[54] REINFORCED-RESIN COATED PLANT FOOD GRANULES

[75] Inventor: William P. Moore, Hopewell, Va.

[73] Assignee: Agri-Nutrients Technology Group, Inc., Disputanta, Va.

[21] Appl. No.: 09/066,664

[22] Filed: Apr. 27, 1998

[51] Int. Cl.[7] ........................................ A61K 9/14
[52] U.S. Cl. .................... 424/400; 424/489; 424/490; 424/497; 424/501; 71/27; 71/28; 71/29; 71/30; 71/31; 71/32; 71/33; 71/48; 71/64.07
[58] Field of Search .................................. 71/271, 28–36, 71/48, 64.07; 424/400, 489, 490, 497, 501

[56] References Cited

U.S. PATENT DOCUMENTS

| | | | |
|---|---|---|---|
| 4,369,055 | 1/1983 | Fujita et al. | 71/64.11 |
| 4,804,403 | 2/1989 | Moore | 71/28 |
| 4,881,963 | 11/1989 | Fujita et al. | 71/64.07 |
| 5,827,540 | 10/1998 | Motojima et al. | 424/489 |

*Primary Examiner*—Neil S. Levy

[57] ABSTRACT

A reinforced-resin coated, attrition resistant controlled release plant food containing water soluble central spheroids of plant nutrients amounting to between 75 and 98 percent and water insoluble resin coatings amounting to between 2 and 25 percent covering the central spheroids with the insoluble resin coatings reinforced with finely divided water insoluble plant nutrients formed in-situ by the chemical coreaction of a plurality of water soluble plant nutrients. The reinforcing nutrients amount to between 5 and 25 percent of the resin coating. A method is provided for preparing the new reinforced-resin coated plant foods with the reinforcing solids distributed throughout the insoluble resins or between thin layers of resins.

8 Claims, No Drawings

REINFORCED-RESIN COATED PLANT FOOD GRANULES

FIELD OF THE INVENTION

The present invention is directed to a reinforced-resin coated controlled release plant food composition and a method for its preparation. The new composition provides controlled release of water soluble plant food through very thin resin coatings made strong enough to withstand repeated handlings, and application, by the inclusion of reinforcing water insoluble plant nutrients formed by chemical coreaction of selected water soluble plant nutrients in the resin before the resin is set. The water insoluble reinforcing plant nutrients provide additional plant nutrients such as secondary and micro nutrients to the plant food composition.

BACKGROUND OF THE INVENTION

My U.S. Pat. Nos. 4,711,659, 4,804,403, and 4,969,947 taught the concept of reacting layers of resins with central granules of water soluble plant foods to provide an attrition resistant controlled release plant food. Also disclosed were the uses of finely divided fillers between the layers of resin, and fillers dispersed in the resin forming monomers. The fillers taught were diluents applied in a variety of ways, usually as dry powders, and never by in-situ coreaction of water-soluble plant nutrients.

U.S. Pat. Nos. 4,369,055 and 4,881,963, Fujita et al, disclose methods of producing slow releasing coated fertilizers using resin coatings containing finely divided fillers, such as talc. No teachings were provided on in-situ reaction of water soluble plant nutrients to form slow releasing plant nutrients to aid the resin coating in resisting attrition of the coated granules.

Commercial delivery, handling, storage, and application of coated plant food granules require conveying, dumping, dropping, rolling, and blending. All of these operations subject the products to substantial attrition. Low integrity coatings, such as sulfur, catastrophically fail under severe handling conditions. Even with very good resin coated granules, as in the foregoing U.S. Patents, vigorous commercial handling reduces the integrity of the coatings. To preserve the desired release rate after attrition, a thicker coating might be used, but this increases costs and introduces wide variations in the actual release rates, depending upon the severity of handling and storage. In commercial practice wide variations in release rates are experienced, even with good resin coatings, particularly thin coatings, because of attrition variations caused by differences in handling and storage operations.

It is an object of this invention to provide a controlled release granular plant food composition which provides for improved attrition resistance by use of reinforced resin coatings on central particles of water soluble plant nutrients.

It is a further object of the invention to provide improved reinforcement of resin coatings by use of very finely divided water insoluble particles of plant nutrients formed in-situ by coreaction of water soluble plant nutrients in layers of water insoluble resin covering central particles of water soluble plant nutrients.

It is a further object of the invention to provide a method for preparing the improved reinforced resin coated attrition resistant controlled release granular plant food.

SUMMARY OF THE INVENTION

I have discovered that resin coatings on controlled release plant food granules may be reinforced to increase their attrition resistance substantially so that granular plant foods coated with thin resin coatings may be stored, handled, shipped and applied, and still retain their effective controlled release properties. This discovery allows a close control of plant food release rates, and eliminates the need to provide extra coating thickness to counteract attrition losses normally experienced in handling, storage, and delivery of resin coated controlled release plant foods.

The reinforced-resin coated, attrition resistant, controlled release, plant food composition I have discovered comprises water soluble central particles of plant nutrients, amounting to between 75 and 98 percent of the controlled release plant food composition; and water insoluble resin coatings, amounting to between 2 and 25 percent, covering the water soluble particles of plant nutrients. The resin coatings are reinforced with finely divided water insoluble plant nutrient moieties which amount to between 5 and 25 percent of the resin coating and must be formed in-situ by chemical reaction of a plurality of water soluble plant nutrient moieties.

An effective method was found for preparing this new composition. It requires the formation of the reinforcing water insoluble plant nutrients in the water insoluble resin by the chemical coreaction of a plurality of water soluble plant nutrients. It is postulated that the efficacy of the reinforcement is achieved by the extremely small particle sizes of the insoluble plant nutrient moieties formed by the reaction of the soluble plant nutrients.

All percentages used in this disclosure are percentages by weight unless otherwise specifically stated.

DISCUSSION OF THE INVENTION

The instant invention is a controlled release plant food composition which employs a reinforced water insoluble resin coating to provide improved resistance to attrition. In this composition, water soluble central particles of plant nutrients may vary from 75 to 98 percent of the total controlled release plant food. When the central soluble granules amount to more than 98 percent, it is not possible to maintain good slow release properties in the coated product. Release rates from the soluble central particles are lower than are normally desired and economics are poor when the central soluble plant nutrient amounts to less than 75 percent.

Included as a necessary part of the instant composition are water insoluble resin coatings, amounting to between 2 and 25 percent, which cover the water soluble central particles of plant nutrients. For the new composition, it is necessary that the resin coatings be reinforced with finely divided water insoluble plant nutrient moieties amounting to between 5 and 25 percent of the resin coating. To achieve the required reinforcing strength in the resin coatings it is necessary that the water insoluble plant nutrient moieties be formed in-situ by the chemical coreaction of two or more water soluble plant nutrient moieties. It is postulated that the in-situ reaction of the soluble plant nutrients to form insoluble plant nutrients is necessary to give the very small particles required to provide the reinforcing strength required for the improved resistance to attrition. The precipitation of highly insoluble materials in water insoluble resins produces much smaller particle sizes than merely grinding solids of the same water insoluble moieties.

The strength of the reinforced resin increases as the particle size of the reinforcing particles decreases, and the strength is improved when the finely divided water insoluble plant nutrient particles are smaller than 50 microns in diameter.

The attrition resistance of the plant food composition is improved when the central particles of water soluble plant nutrients amount to between 85 and 97 percent and the reinforced-resin coating amounts to between 3 and 15 percent of the controlled release plant food composition.

The strength of the reinforced resin coating is further improved when the reinforcing plant food moieties amount to between 8 and 20 percent of the reinforced resin coating. When more than 20 percent is included, the resin coating loses some of its controlled release properties; and when less than 8 percent is included, the coating loses some resistance to attrition.

The reinforcing water insoluble plant nutrients may be included in the resin coating in several different ways. An effective composition provides the reinforcing water insoluble plant nutrients, homogeneously formed in-situ, throughout the reinforced water insoluble resin coating.

In a similar effective composition, the reinforcing water insoluble plant nutrient moieties may be formed in-situ as layers between a plurality of layers of the water insoluble resin coating.

Several different water soluble plant nutrient moieties may be coreacted effectively to form water insoluble reinforcing moieties. Water insoluble plant food moieties are particularly effective when formed in-situ by chemical coreaction of a plurality of the following plant nutrient moieties: phosphoric acid, magnesium oxide, potassium hydroxide, ammonium phosphate, potassium phosphate, cyanuric acid, and melamine.

The water insoluble reinforcing plant nutrient moieties may be formed in several different ways. In one effective form of the composition, the reinforcing water insoluble plant nutrient moieties are formed in the water insoluble resin prior to the resins coating of the central particles of soluble plant nutrients.

In another effective form of the composition, the water insoluble plant nutrient moieties are formed in-situ in the water insoluble resin simultaneously with the coating of the resin onto the central particles of soluble plant nutrients.

Water insoluble plant nutrient moieties which provide excellent attrition resistance in the instant plant food composition include magnesium phosphate, calcium phosphate, iron phosphate, magnesium ammonium phosphate, magnesium potassium phosphate, and melamine cyanurate.

Although particulate water soluble plant nutrients of the types generally used in agriculture may be used in the instant composition, the composition is most effective when the water soluble particles of plant nutrients consist of spheroid granules.

The instant plant food composition is particularly economical and effective when the water soluble central particles of plant nutrients in the composition consist of one or more of the following materials: urea, potassium chloride, potassium nitrate, ammonium phosphate, ammonium nitrate, potassium sulfate, and ammonium sulfate.

A variety of water insoluble resins may be used in the instant composition so long as they are water insoluble and may be used to effective coat the central water soluble plant nutrient particles. The plant food composition is particularly effective when th e water insoluble resin is one of the following resins: polyurethanes, polyalkenes, polyvinyls, polyphenylenes, polystyrenes, and petroleum tars.

A particularly economical reinforced-resin coated, controlled release plant food composition which provides improved resistance to attrition and is a preferred embodiment of the instant invention comprises: spheroid granules of water soluble plant nutrients having diameters between 0.5 and 8.0 millimeters, amounting to between 85 and 97 percent of the total controlled release plant composition; and a water insoluble reinforced-resin coating, amounting to between 3 and 15 percent of the controlled release plant food composition, covering the spheroid granules. The water insoluble resin is reinforced with fine particles of water insoluble, controlled release plant nutrients which exhibit particle diameters smaller than 20 microns and are formed in-situ by chemical reaction of several water soluble plant nutrients. The fine particles formed in-situ amount to between 8 and 20 percent of the reinforced resin coating, with the fine particles dispersed in the resin coating.

The utility of the composition is improved further when the water insoluble resin is reinforced with fine particles of water insoluble, controlled release plant nutrients which are valuable secondary nutrients and micronutrients. These effective nutrients include iron, copper, manganese, zinc, magnesium, calcium and boron.

The composition of this invention imposes limits which must be closely controlled so that the special performances of the composition may be achieved. The composition may be prepared in equipment available generally in the coating industry. I have found a method which is uniquely effective for producing the instant composition.

This effective method of preparing an attrition resistant reinforced-resin coated controlled release plant food composition requires admixing a plurality of water soluble plant nutrient moieties, which have the abilities to coreact chemically to form water insoluble plant nutrient moieties, in a liquid water insoluble resin.

The plurality of water soluble plant nutrient moieties are coreacted until water insoluble plant food moieties are formed in-situ with particle diameters smaller than 50 microns, and which amount to between 8 and 20 percent of the water insoluble liquid resin. Particle diameters less than 50 microns are required to provide controlled release of the soluble nutrients through the resin coating and at least 8 percent insoluble plant food reinforcement is the preferred amount to provide the necessary attrition resistance. When more than 20 percent is used, controlled release effectiveness is reduced.

A plurality of thin layers of the insoluble liquid resin is applied to a mobile mass of water soluble plant food spheroids which have diameters larger than 0.3 millimeters and which amount to between 75 and 98 percent of the controlled release plant food composition.

Coating spheroids with diameters smaller than 0.3 millimeter is not economically effective in controlling plant food release rates. Spheroids as large as 8 millimeters may be effectively coated by the instant method. The practical lower limit of the water soluble plant food spheroid concentration is 75 percent because using more coating contributes no further benefit to release rate or attrition resistance. Concentrations as high as 98 percent are effective in controlling plant food release rates and providing attrition resistance.

Applying a plurality of thin layers of the insoluble liquid resin provides better attrition resistance than the application of a single layer of an equal percentage of resin.

In the method of this invention, the application of thin layers is continued until the water soluble plant food spheroids are covered by liquid water insoluble resin which amounts to between 2 and 25 percent, including the water insoluble reinforcing plant nutrient, of the total controlled release composition.

To complete the preparation method, the covered plant food spheroids are heated at a temperature between 60 and 140° C. until the water content of the total composition is reduced to between 1 and 2 percent to convert the fine water insoluble plant nutrient particles to reinforcement for the thin layers of resin. The thin layers of resin are hardened by the heating to an attrition resistant coating for controlling the release of the water soluble plant food.

The temperature must be at least 60° C. to harden the liquid resin and combine it with the drying fine plant nutrient particles. The drying to remove moisture is normally done at temperatures higher than 100° C. but vacuum drying allows use of temperatures as low as 60° C. Temperatures in excess of 140° C. reduce the integrity of the resin bonds and also usually melt or cause crystal changes in the spheroid plant foods to compromise the controlled release properties of the composition.

In the instant method, water soluble plant nutrient moieties which may be effectively used to form reinforcing water insoluble plant food moieties consist of phosphoric acid, ammonia, ammonium phosphate, potassium hydroxide, potassium phosphate, magnesium oxide, melamine, and cyanuric acid. These plant foods need have only sufficient water solubility to allow them to coreact to form water insoluble plant nutrients.

Water insoluble plant nutrient moieties useful in the instant method must be sufficiently water insoluble that they do not grow crystals when formed but immediately precipitate very fine particles which do not grow into larger crystals. Magnesium ammonium phosphate, magnesium potassium phosphate, magnesium phosphates, calcium phosphate, iron phosphate, and melamine cyanurate are effective insoluble plant nutrients in that they are effective reinforcements against attrition of the resin coatings and are useful plant nutrients.

The instant method performs well when the mobile mass of water soluble plant food spheroids consists of one or more of the following fertilizer materials: urea, potassium chloride, potassium nitrate, ammonium phosphate, ammonium nitrate, potassium sulfate, and ammonium sulfate.

The resins used in the method of this invention must form a high integrity film while covering the spheroid plant food materials and then harden to an attrition resisting coating when heated. Liquid resins which performed well in this method include: polyurethanes, isocyanate-polyols, polyalkenes, polystyrenes, and alkyd polymers.

In the preferred method of preparing the controlled release plant food composition, the central spheroid of plant food is coated with thin layers of water-insoluble resin reinforced against attrition by finely divided water insoluble plant nutrients, formed in the thin resin layers. Four steps are included in the method.

In the first step, a liquid water insoluble resin is divided into two about equal parts. Then, different water soluble plant nutrient moieties are admixed into the two separate liquid resins. The two soluble nutrient moieties used must have an ability to chemically coreact with the other soluble plant nutrient moieties to form a water insoluble plant nutrient moiety.

Each of the two liquid resins are then applied alternatingly as thin layers to a mobile mass of water soluble plant food spheroids having diameters between 0.3 and 8.0 millimeters and amounting to between 75 and 98 percent of the total controlled release composition.

Application of the thin layers is continued so that each of the water soluble plant nutrient moieties comixes and chemically coreacts until between 2 and 25 percent of water insoluble liquid resin containing between 8 and 20 percent water insoluble plant nutrient moieties coat the water soluble plant food spheroids. For best effectiveness, the water insoluble plant food moieties have particle diameters between 1 and 15 microns.

The method is completed by heating the coated plant food spheroids at a temperature between 80 and 120° C. until the water content of the total composition is reduced to between 0 and 1 percent, to convert the water insoluble plant nutrient moieties to reinforcement for the thin layers of resin which are hardened by the heat to an attrition resistant coating for controlling release of the water soluble plant food.

The method may be operated effectively by allowing the soluble plant nutrients to react to form the water insoluble reinforcement of the thin layers of resin coating simultaneously with the polymerization of the liquid resin monomers and oligomers to form the hardened coatings.

The preferred method utilizes the liquid water insoluble resin as a isocyanate-polyol oligomer which is polymerized in-situ simultaneously with the formation of water insoluble plant nutrient reinforcement of the resin coating.

EXAMPLES OF THE PREFERRED EMBODIMENT

The examples provided here demonstrate the utility of the present invention and its preferred embodiment. The first three examples demonstrate the preferred preparation and composition of the controlled release plant food of this invention and its utility as an attrition resistant, effective plant food product.

Example 1

An attrition resistant controlled release plant food composition having a reinforced resin coating was selected for evaluation of its physical properties. The selected composition contained water soluble central spheroid urea particles with diameters between 1.4 and 4.7 millimeters in diameter. The urea amounted to 95 percent of the composition and was coated with a reinforced, cured water insoluble polyurethane resin which surrounded and completely covered the urea. The polyurethane coating amounted to 5 percent of the total composition. The polyurethane coating was reinforced by finely divided, water insoluble, plant nutrient particles, measuring less than 20 microns in diameter, and amounting to 20 percent of the polyurethane coating. The water insoluble plant nutrient comprised melamine cyanurate formed in-situ by the reaction of soluble melamine and cyanuric acid.

Example 2

The composition from Example 1 was evaluated for resistance to attrition along with a sample of urea coated with 5 percent polyurethane resin, without the insoluble reinforcing solids, by dropping 20 feet through a 12" diameter chute directly onto a steel plate. After 12 drops, the 24 hour solubility of the samples were determined by adding 25 grams sample to 100 ml water at 80° F. with the results obtained as follows:

| Sample | % N Dissolution |
| --- | --- |
| 5% Urethane Coated Urea | 15 |
| Example 1 product | 8 |

Example 3

A terephthate polyester polyol derived from recycling polyester plastic bottles was selected for use in preparing a water insoluble resin. It had a hydroxyl number of 240, contained 10 percent free triethylene glycol, 1 percent water, and exhibited a viscosity of 12,100 centipoise at 25° C. The polyol was heated to 80° C. and melamine amounting to 8 percent was homogeneously mixed into the liquid polyol in a holding tank. Triethanolamine amounting to 2 percent was also added to the polyol as a polymerization catalyst.

In a second holding tank was contained liquid oligomer diphenylmethane diisocyanate, comprising 30 percent NCO, and consisting of 50 percent diphenylmethane diisocyanate (MDI) and 50 percent higher oligomers of MDI. The MDI was heated to 60° C. and isocyanuric acid amounting to 8 percent was homogeneously mixed therein.

To a laboratory rotary drum coater, 24 inches in diameter, 10 inches long, fitted with 15 slanted lifts to induce particle rolling, 4000 grams of −4+8 mesh spheroid urea particles, containing 46 percent nitrogen was added. The rotary drum was rotated at a speed of 30 rpm and a hot air blower applied directly to the rolling urea granules was used to heat the urea to a temperature of 95° C.

As the urea granules continued to roll a thin layer of the MDI-isocyanuric acid liquid was sprayed onto the urea, amounting to 40.0 grams. One minute time was allowed for the reaction of the MDI with the urea, and then polyol-melamine amounting to 40.0 grams was sprayed on top of the MDI-isocyanuric layer. The layers were allowed 1 minute at 95° C. to react. The melamine and isocyanuric acid reacted to form very fine particles of melamine cyanurate and the MDI and polyol reacted and polymerized to form very strong water insoluble polyurethane resin. The sprays of the MDI-isocyanuric acid, and the polyol-melamine layers were repeated until a total of 240.0 grams coatings were applied. After a final 2 minutes reaction time, the coated urea was cooled to ambient temperature and evaluated.

Examination of the individual coated urea particles with a 200 power microscope showed the coating to be continuous, covering and surrounding the urea. The melamine cyanurate particles distributed in the thin resin coatings were determined to be 5 micron and less in diameter by comparison with fiber glass particles of known diameters.

The total amount of coating on the urea spheroids was determined to be 6.2 percent by grinding the particles and washing out the free urea. Melamine cyanurate content of the total composition was determined to be 0.5 percent.

Keldahl analysis of the coated spheroids showed a total of 44.3 percent of total nitrogen.

Example 4

A 1000 gram sample of the spheroid product of Example 3 was evaluated for resistance to attrition along with a sample of urea coated with 5 percent urethane resin without the reinforcing solids by dropping 20 feet through a 12" diameter directly onto a steel plate. After 12 drops, 24 hour solubilities were determined, as in Example 1. The results are listed as follows:

| Sample | % N Dissolution |
| --- | --- |
| Example 3 product | 4 |
| 5% Urethane Coated urea | 15 |

Example 5

Low molecular weight branched chain polyethylene resin having a molecular weight of 4000 and a melting point of 110° C. was placed into two containers. In one container at 125° C. was stirred in homogeneously −100 mesh monopotassium phosphate amounting to 10.0 percent. In the other container at 125° C. was stirred in homogeneously −200 mesh magnesium oxide amounting to 3.0 percent.

In the laboratory rotary drum coater used in Example 3, 4000 grams of spheroid granules of potassium chloride was heated to a temperature of 85° C. Alternate sprays of 40 grams each were made from the polyethylene containers until 6 applications had been made from each container for a total of 12 applications amounting to 480 grams. Two minutes were allowed between each spray to allow the reaction between the monopotassium phosphate and the magnesium oxide to form water insoluble magnesium potassium phosphate and for the water insoluble resin to lose its stickiness.

After the coatings were completed, the coated granules were cooled and evaluated. The total coating was determined by grinding a sample, removing the soluble potassium chloride and weighing the remaining solids after drying. The total coating was 11.7 percent. The amount of magnesium potassium phosphate was determined to be 0.65 percent.

Example 6

The reinforced-resin coated product was dropped 20 feet through a 12" diameter chute onto a steel plate 10 times and then given a 7 day dissolution test at 25° C. The amount of potassium chloride dissolved was only 23 percent.

The amount of fines (−20 mesh) generated during the 10 drops of the 1000 gram sample was less than 0.5 percent of the sample.

I claim:

1. A particulate, controlled release plant food composition resistant to attrition during storage, handling, shipping, and application, comprising:

(a) water soluble central particles of plant nutrients, selected from the group consisting of urea, ammonium, nitrate, ammonium phosphate, ammonium sulfate, potassium chloride, potassium nitrate, and potassium sulfate, amounting to between 75 and 98 percent of the plant food composition;

(b) water insoluble resin coatings, selected from the group consisting of polyurethanes, isocyanate-polyols, polyalkenes, polystyrenes, and alkyd polymers, amounting to between 2 and 25 percent of the plant food composition, covering the water soluble central particles of plant nutrients; and, (c) water insoluble plant nutrient particles, exhibiting diameters smaller than 50 microns, dispersed in the resin coatings, the nutrient particles being selected from the group consisting of magnesium ammonium phosphate, magnesium potassium phosphate, magnesium phosphate, iron phosphate, and melamine cyanurate, the nutrient particles being formed in-situ by chemical coreaction of a plurality of plant food moieties selected from the group consisting of phosphoric acid, magnesium oxide, potassium hydroxide, ammonium phosphate, cyanuric acid and melamine.

2. The plant food composition of claim 1 wherein the central particles of water soluble plant nutrients amount to between 85 and 97 percent, and the resin coating amounts to between 3 and 15 percent of the controlled release plant food composition.

3. The plant food composition of claim 1 wherein the water insoluble plant nutrient moieties amount to between 8 and 20 percent of the resin coating.

4. The plant food composition of claim 1 wherein the water insoluble plant nutrient moieties are homogeneously formed in-situ throughout the water insoluble resin coating.

5. The plant food composition of claim 1 wherein the water insoluble plant nutrient moieties are formed in-situ as layers between a plurality of layers of the water insoluble resin coatings.

6. The plant food composition of claim 1 wherein the water insoluble plant nutrient moieties are formed in the water insoluble resin prior to its coating of the central particles of soluble plant nutrients.

7. The plant food composition of claim 1 wherein the water insoluble plant nutrient moieties are formed in-situ in the water insoluble resin simultaneously with the coating of the resin onto the central particles of soluble plant nutrients.

8. The plant food composition of claim 1 wherein the water soluble central particles of plant nutrients consist of spheroid granules.

* * * * *